United States Patent
Nakazawa et al.

(10) Patent No.: US 9,377,081 B2
(45) Date of Patent: Jun. 28, 2016

(54) CHAIN FOR CONTINUOUSLY VARIABLE TRANSMISSION

(71) Applicant: JTEKT CORPORATION, Osaka-shi, Osaka (JP)

(72) Inventors: Teruhiko Nakazawa, Nagoya (JP); Shinji Yasuhara, Yamatokoriyama (JP); Taizou Wakayama, Kashiwara (JP)

(73) Assignee: JTEKT CORPORATION, Osaka (JP)

( * ) Notice: Subject to any disclaimer, the term of this patent is extended or adjusted under 35 U.S.C. 154(b) by 219 days.

(21) Appl. No.: 13/957,691

(22) Filed: Aug. 2, 2013

(65) Prior Publication Data

US 2014/0045633 A1    Feb. 13, 2014

(30) Foreign Application Priority Data

Aug. 10, 2012  (JP) ................ 2012-177959
Sep. 25, 2012  (JP) ................ 2012-210901

(51) Int. Cl.
*F16G 13/02* (2006.01)
*F16G 5/18* (2006.01)

(52) U.S. Cl.
CPC . *F16G 13/02* (2013.01); *F16G 5/18* (2013.01)

(58) Field of Classification Search
CPC .................................. F16G 5/18; F16G 13/02
USPC ......................... 474/206, 212, 242
See application file for complete search history.

(56) References Cited

U.S. PATENT DOCUMENTS

| 4,710,154 A | 12/1987 | Rattunde |
| 4,764,158 A | 8/1988 | Honda et al. |
| 5,728,021 A * | 3/1998 | van Rooij et al. ............ 474/229 |
| 6,406,396 B1 * | 6/2002 | Turner .......................... 474/242 |
| 2005/0202915 A1 * | 9/2005 | Pichura et al. ............... 474/206 |
| 2007/0082517 A1 | 4/2007 | Lou et al. |
| 2007/0298922 A1 * | 12/2007 | Triller et al. .................. 474/215 |

FOREIGN PATENT DOCUMENTS

| CN | 201866181 U | 6/2011 |
| DE | 3740504 C1 | 6/1989 |
| EP | 0741255 A1 | 11/1996 |
| EP | 1 698 800 A1 | 9/2006 |
| JP | H08-312725 A | 11/1996 |
| JP | B2-3477545 | 12/2003 |
| JP | 2006-170314 A | 6/2006 |
| JP | 4946050 B2 | 6/2012 |

OTHER PUBLICATIONS

Mar. 19, 2015 Search Report issued in European Application No. 13179718.5.

* cited by examiner

*Primary Examiner* — William E Dondero
*Assistant Examiner* — Robert T Reese
(74) *Attorney, Agent, or Firm* — Oliff PLC

(57) ABSTRACT

Adjacent chain elements transmit a tension by allowing two pins to contact each other. When a chain which has been in a linear state starts to bend, a contact point moves from one point to another. Such movement of the contact point generates a force couple. This force couple causes the rear end of the chain element to move in a lifted manner. An increasing rate of this amount of movement with respect to a relative angle to an adjacent chain element is set such that the increasing rate is small when the relative angle is small, and becomes larger when the relative angle becomes larger.

15 Claims, 14 Drawing Sheets

CHAIN FOR CONTINUOUSLY VARIABLE TRANSMISSION

PRIORITY INFORMATION

This application is based on and claims priority from Japanese Patent Application Nos. 2012-177959 filed on Aug. 10, 2012 and 2012-210901 filed on Sep. 25, 2012, the entire disclosures of which, including the specifications, claims, drawings, and abstracts, are incorporated herein by reference in their entirety.

BACKGROUND

1. Technical Field

The present invention relates to a chain for a chain-type continuously variable transmission, and more particularly to a structure of the chain.

2. Background Art

There are known continuously variable transmissions including two pulleys each having conical surfaces that face each other, the distance therebetween being variable, and a flexible endless member which is wound around the two pulleys. The rotation of one pulley is transmitted to the other pulley through the flexible endless member. At this time, by changing the distance between the conical surfaces, it is possible to change the winding radius of the flexible endless member with respect to the pulley, thereby allowing the transmission ratio to change. Japanese Patent No. 3,477,545 discloses a chain for use as a flexible endless member of a continuously variable transmission.

This chain is formed by arranging a plurality of chain elements in a circumferential direction and interconnecting them. Each chain element includes plate-shaped links having openings at respective end of the link, and a pin and an inter-piece both passing though each of the openings. Each link is positioned along the chain circumferential direction. Further, a plurality of links are arranged in the width direction of the chain, and these links, pin, and inter-piece constitute one element. The pins and the inter-pieces pass through the links arranged in the width direction. Both ends of the pin come into contact with the conical surfaces of the pulley. The chain elements that are adjacent to each other are interconnected by allowing the pin or the inter-piece of one chain element of the adjacent chain elements to pass through the opening of the other chain element. Power is transmitted between the chain elements via contact surfaces of the pin and the inter-piece. The pin and the inter-piece rotate on the contact surfaces and come into contact with each other, thereby allowing the chain to bend.

Japanese Patent No. 3,477,545 also discloses suppressing vibration (chordal action) of a linear portion of the chain wound around two pulleys. It describes that this vibration is partly caused by up and down movement of the pin, which is located on the boundary between the linear portion of the chain and the arc-like portion in the pulley, when the pin moves in an arc motion as the pulley rotates (see paragraph 0012). This movement of the pin produces up and down movement of the linear portion. Japanese Patent No. 3,477,545 further discloses that vibration is also partly caused by rapid change of the direction along which the pin moves to enter the pulley after the pin first contacts the pulley (see paragraphs 0013 and 0014).

It also suggests that, in order to reduce above-described vibration of the linear portion, a position at which the pin first contacts the pulley is set at a higher position (paragraph 0016). The tension acts on the chain to generate a force couple, and this force couple acts to lift the subsequent element of the adjacent chain elements. Thus, a position at which the pin first contacts the pulley when it enters the pulley is set at the highest position or a position near that position; that is, a position on the outer side of the pulley in the radial direction or a position near that position.

SUMMARY

Technical Problems

Japanese Patent No. 3,477,545 discloses that chordal action of the chain is suppressed by setting a position at which the pin first contacts the pulley at a higher position. However, there has been a problem that approach from such a standpoint cannot reduce vibration sufficiently.

The object of the present invention is to provide a new method to suppress chordal action of a chain of a chain-type continuously variable transmission.

Means for Solving the Problems

The chain for a continuously variable transmission according to the present invention is wound around and moves around two pulleys having conical surfaces that face each other, the distance therebetween being variable. This chain is a flexible endless member in which a plurality of chain elements are interconnected. Each chain element includes a link unit composed of a plurality of plate-shaped links, each link having an opening at either end, and two pins extending through these links. Each link may have a single opening which extends to both ends thereof. The links constituting a link unit, each positioned along the circumferential direction of the chain, are arranged in the width direction of the chain. Two pins are arranged so as to extend through the links arranged in the width direction. More specifically, the two pins extend through the openings of the links at the respective ends of the links, respectively. The pin of one element of the chain elements that are adjacent to each other along the circumferential direction is extended through the opening of the link of the other element, thereby interconnecting the adjacent chain elements.

The pins of the adjacent chain elements come into contact each other at their side surfaces and transmit the tension acting on the chain. When the chain bends, the pins, which contact each other and transmit the tension, contact each other in a rolling manner. In other words, as the chain bends, a contact point between the pins moves consecutively. The contact surfaces of the pins are shaped such that, as the chain bends, the contact point moves to the outer side of the moving chain. Such movement of the contact point generates a force couple which acts on the subsequent chain element and lift the rear end of the subsequent chain. In other words, this force couple allows the rear end of the subsequent chain to move to the outer side of the chain.

When the chain bends, the amount of movement of the contact point is determined by the shape of the contact surfaces of the pins. The contact surfaces are two surfaces that face each other, and a relative relationship between these surfaces determines the amount of movement. One contact surface may be a flat surface, while the other may be a curved surface. Alternatively, both of the two contact surfaces may be curved surfaces, and in this case, the same advantages as in the combination of the flat surface and the curved surface can be obtained by dividing between the two curved surfaces the curvature which is obtained from the other curved surface when the one surface is the flat surface. A relative shape of a cross section of this contact surface obtained in a direction orthogonal to the chain width direction will be referred to as a relative action curve.

The relationship between an inter-adjacent element angle, which is a relative angle between the adjacent chain elements and the amount of movement of the contact point, is determined such that, compared to when the relative action curve has an involute shape, the increasing rate of the amount of movement is smaller when the angle between the adjacent elements is small, and the increasing rate of the amount of movement becomes larger when the angle between the adjacent elements becomes larger.

Thus, when the inter-adjacent element angle is small; that is, when the chain does not bend very much, the force couple acting on the subsequent chain element is small, and the lifting effect is also small. Conversely, when the inter-adjacent element angle becomes larger, and the chain bends to a great extent, the force couple suddenly becomes larger, and the lifting effect also becomes larger.

If, immediately before the chain element enters the pulley; that is, when the inter-adjacent element angle is still small, the force couple strongly acts on the chain element, the rear end of this element is lifted, and a further element subsequent to this element is also lifted. Conversely, when the force couple which acts on the chain element immediately before the chain enters the pulley is small, the chain element is lifted to a small degree, and a degree to which a further subsequent element is lifted is also reduced. Thus, chordal action of the portion of the chain between the pulleys is reduced.

When the inter-adjacent element angle is $\theta$, the relative action curve is a curve having a curvature radius of any point on the relative action curve expressed by $$r_0 + r\theta^\tau$$

where $\tau > 1$, and $r_0$ and $r$ are any real numbers.

Advantageous Effects

When the bending of the chain is small, the effect of lifting the subsequent element is reduced, while when the bending of the chain becomes larger, the lifting effect is increased, to thereby reduce vibration of the chord portion of the chain.

DESCRIPTION OF EMBODIMENTS

Figure 1:
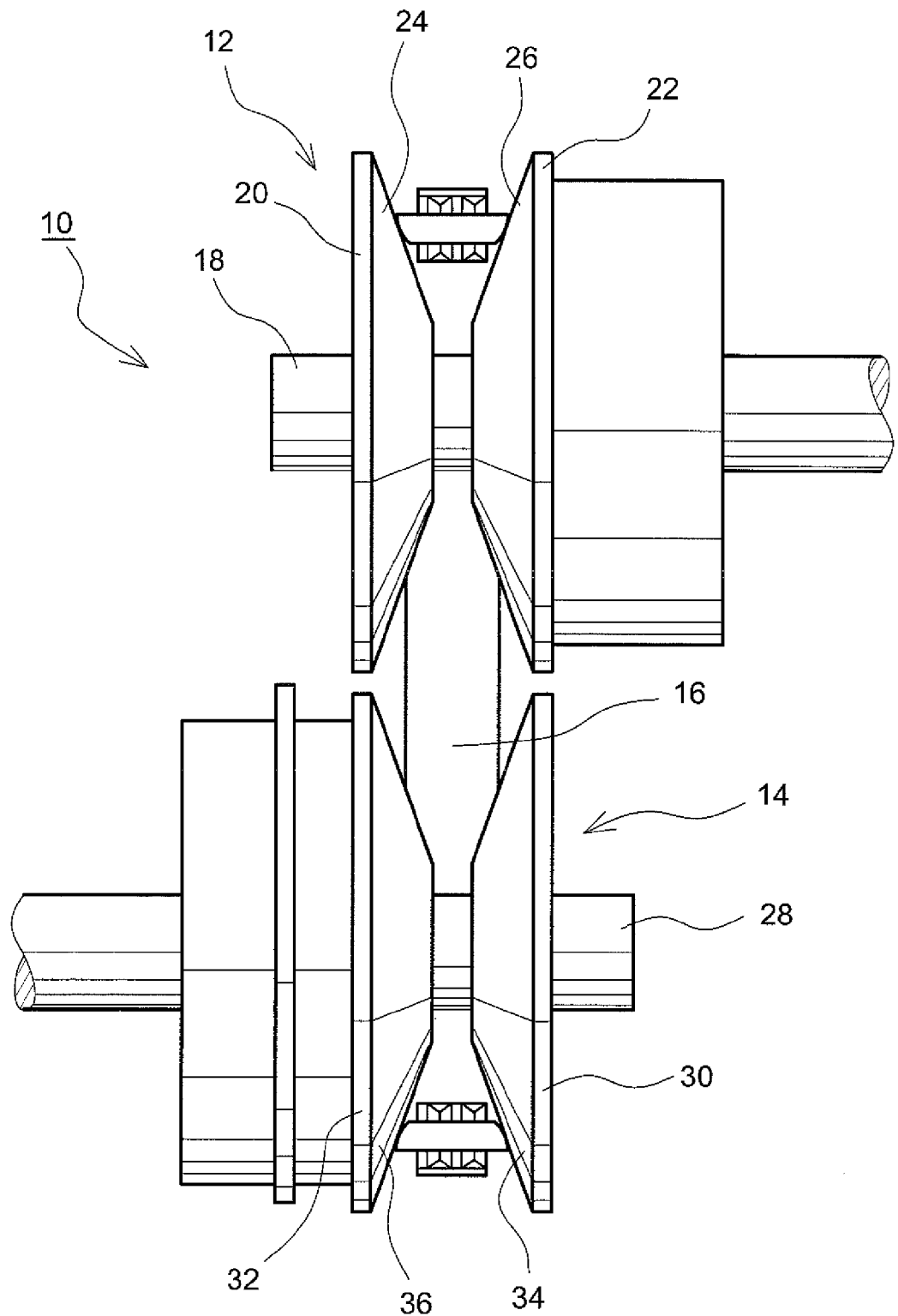
FIG. 1 is a diagram illustrating a principal portion of a chain-type continuously variable transmission.

Preferred embodiments of the present invention will be described with reference to the accompanying drawings. FIG. 1 illustrates a principal portion of a chain-type continuously variable transmission 10. The chain-type continuously variable transmission 10 includes two pulleys 12 and 14, and a chain 16 which is wound around these pulleys. One of the two pulleys will be referred to as an input pulley 12 and the other will be referred to as an output pulley 14. The input pulley 12 has a fixed sheave 20 which is fixed to an input shaft 18, and a movable sheave 22 which rotates along with the input shaft 18 and is movable on the input shaft 18 by sliding along the input shaft 18. A surface of the fixed sheave 20 and a surface of the movable sheave 22 that face each other have a shape of a substantially lateral surface of a cone. These surfaces will be referred to as substantially conical surfaces 24 and 26. These substantially conical surfaces 24 and 26 together form a V-shaped groove, in which the chain 16 is disposed such that side surfaces of the chain 16 are clamped between the substantially conical surfaces 24 and 26. Similar to the input pulley 12, the output pulley 14 also includes a fixed sheave 30 which is fixed to an output shaft 28, and a movable sheave 32 which rotates along with the output shaft 28 and is movable on the output shaft 28 by sliding along the output shaft 28. A surface of the fixed sheave 30 and a surface of the movable sheave 32 that face each other have a shape of a substantially lateral surface of a cone. These surfaces will be referred to as substantially conical surfaces 34 and 36. These substantially conical surfaces 34 and 36 together form a V-shaped groove, in which the chain 16 is disposed such that side surfaces of the chain 16 are clamped between the substantially conical surfaces 34 and 36.

The arrangement of the fixed sheave and the movable sheave is reversed between the input pulley 12 and the output pulley 14. Specifically, in FIG. 1, the movable sheave 22 is located on the right side of the input pulley 12, whereas the movable sheave 32 is located on the left side of the output pulley 14. By sliding the movable sheave 22 or 32, the distance between the substantially conical surfaces 24 and 26 that face each other changes, or the distance between the substantially conical surfaces 34 and 36 that face each other changes, which changes a width of the V-shaped groove formed by these substantially conical surfaces. With this change of the groove width, the chain winding radius also changes. More specifically, when the movable sheave 22, 32 moves away from the fixed sheave 20, 30, the groove width increases, so that the chain 16 moves to a deeper position in the groove to thereby decrease the winding radius. Conversely, when the movable sheave 22, 32 moves toward the fixed sheave 20, 30, the groove width decreases, so that the chain 16 moves to shallower position in the groove to thereby increase the winding radius. As the change in the winding radius is reversed between the input pulley 12 and the output pulley 14, the chain 16 is prevented from being loosened. With the sliding of the movable sheave 22, 32, the width of the V-shaped groove changes continuously, which results in continuous change of the winding radius. As such, the transmission ratio during transmission from the input shaft 18 to the output shaft 28 can be changed continuously.

Figure 2:
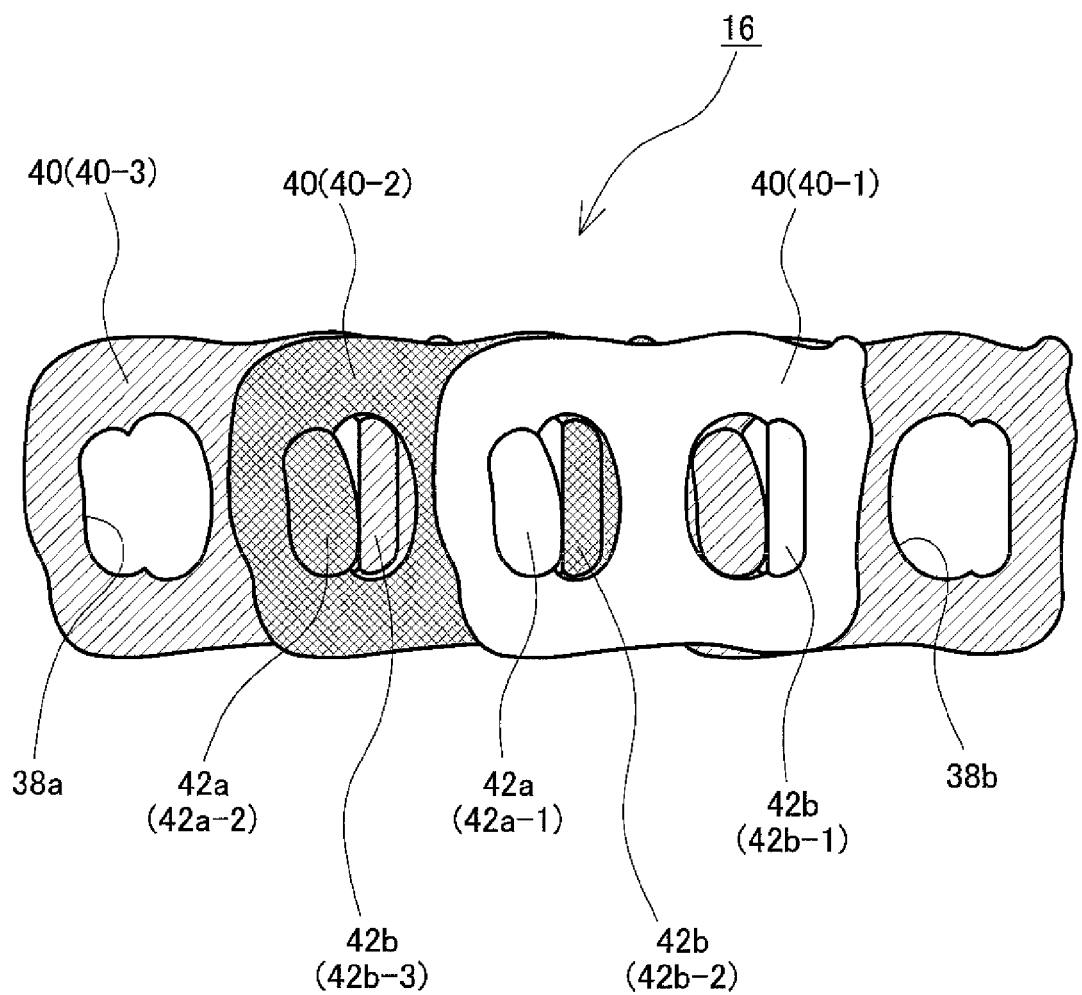
FIG. 2 is a diagram of a chain viewed from its width direction.
Figure 3:
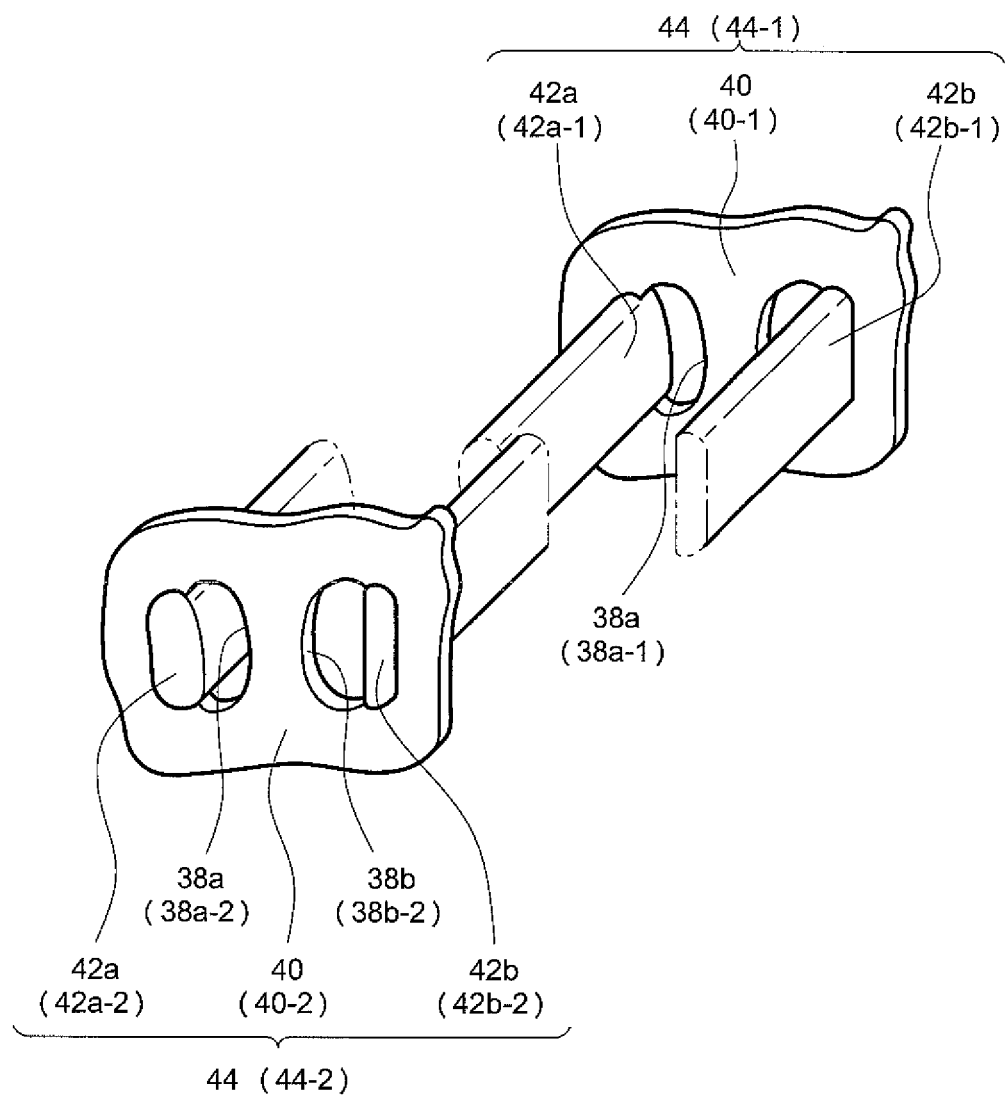
FIG. 3 is a perspective diagram for explaining the structure of a chain.
Figure 4:
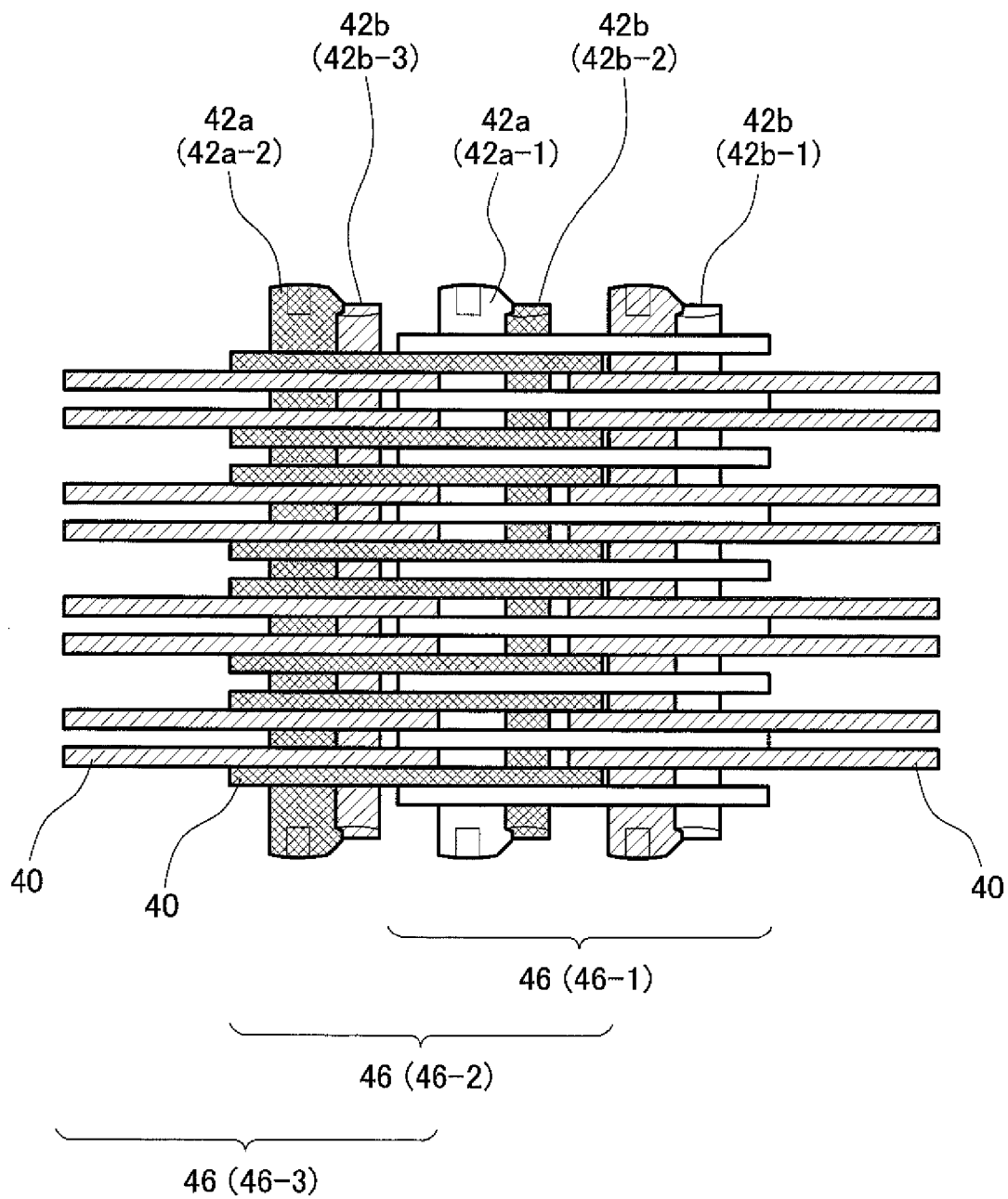
FIG. 4 is a diagram of a chain viewed from its thickness direction.

FIGS. 2 to 4 illustrate details of a structure of the chain 16. In the following description, the direction along the extending direction of the chain 16 will be referred to as a circumferential direction, and the direction which is orthogonal to the circumferential direction and is parallel to the input shaft 18 and the output shaft 28 will be referred to as a width direction, and the direction which is orthogonal to the circumferential direction and the width direction will be referred to as a thickness direction. FIG. 2 is a diagram illustrating a portion of the chain 16 viewed from the width direction. FIG. 3 is a diagram illustrating a part of the chain 16 which is extracted and decomposed. FIG. 4 is a diagram illustrating a portion of the chain 16 viewed from the outer circumference side in the thickness direction.

Figure 3A:
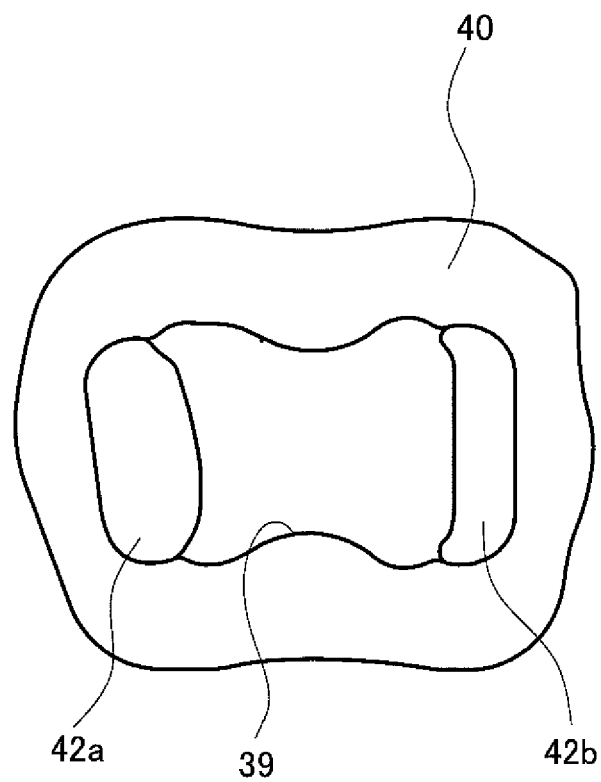
FIG. 3A is a diagram of link having a single opening.

In FIG. 2, the right-left direction corresponds to the circumferential direction, the up-down direction corresponds to the thickness direction, and the direction penetrating the plane of the figure corresponds to the width direction. Further, the upper side of the figure corresponds to the outer side of the chain 16. The chain 16 is formed of a combination of plate-shaped links 40, each link having openings 38a and 38b, and rod-shaped pins 42a and 42b. The individual links 40 have the same shape when viewed from the chain width direction side. The rod-shaped pins 42a have the same shape, and the rod-shaped pins 42b have the same shape. The thickness of the link may be common among all links or may not be common. The links 40 are arranged in a predetermined pattern (see FIG. 4) in the width direction, and two pins 42a and 42b extend through the openings 38a and 38b at respective ends of the links. Both ends of the two pins 42a and 42b, or both ends of one of these pins, come into contact with the conical surfaces 24 and 26 and the conical surfaces 34 and 36 of the input and output pulleys 12 and 14. A set of these two pins 42a and 42b and the links through which these two pins 42a and 42b extend will be referred to as a chain element 44 (see FIG. 3). The two openings 38a and 38b may be connected to provide a single opening 39 (see FIG. 3A).

FIG. 3 illustrates two chain elements 44-1 and 44-2 in which some parts are omitted. The suffixes "-1", "-2", "-3" are used to discriminate a chain element, and a link and pins included in the chain element, from those of other chain elements. The chain element 44-2 is composed of a plurality of links 40-2 and the two pins 42a-2 and 42b-2 extending through the links 40-2. The two pins 42a-2 and 42b-2 are press fitted into or fixed and bonded to the openings 38a-2 and 38b-2 at both ends of the link 40-2. Similarly, the chain element 44-1 is composed of a plurality of links 40-1 and the two pins 42a-1 and 42b-1 extending therethrough. Further, a plurality of links 40 included in one chain element form a link unit 46.

The chain elements 44-1 and 44-2 which are adjacent to each other can be interconnected by allowing the pin 42a, 42b of one chain element to pass through the opening 38a, 38b in the other chain element and vice versa. As illustrated in FIG. 3, the pin 42b-2 of the chain element 44-2 on the left side of the drawing is placed within the opening 38a-1 so as to be positioned on the right side of the pin 42a-1 of the chain element 44-1 on the right side. Conversely, the pin 42a-1 of the chain element 44-1 on the right side is placed within the opening 38b-2 so as to be positioned on the left side of the pin 42b-2 of the chain element 44-2 on the left side. These two pins 42b-1 and 42a-2 come into contact with each other at their side surfaces, thereby transmitting the tension of the chain 16. When the chain bends, the adjacent pins, such as the pins 42b-1 and 42a-2, move such that they roll on the contact surfaces of the other pins, thereby allowing the chain to bend.

FIG. 4 is a diagram illustrating one example arrangement pattern of the links 40. Each link 40 belongs to one row, which will be referred to as the first row, the second row, and so on, from the left side of the drawing. In the example illustrated in FIG. 4, the link 40 in the first row belongs to a first link unit 46-1, the link 40 in the second row belongs to a second link unit 46-2, and the link 40 in the third row belongs to a third link unit 46-3.

Figure 5:
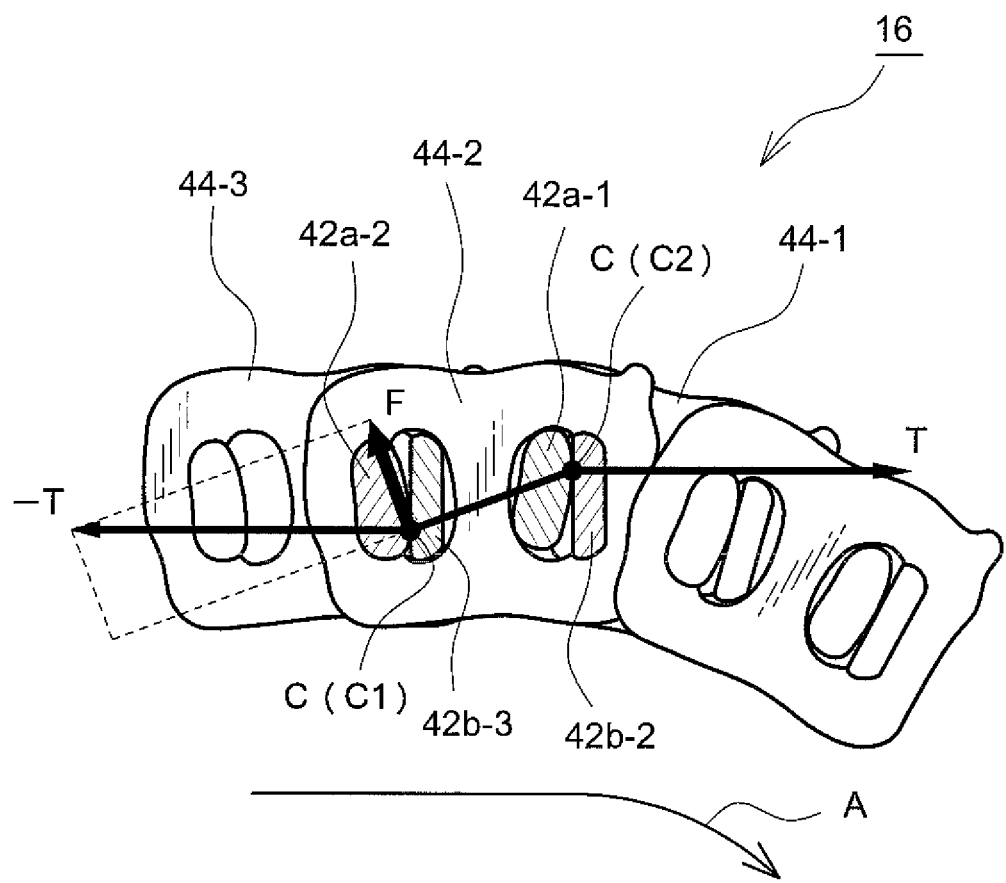
FIG. 5 is a diagram for explaining force of lifting chain elements.

FIG. 5 illustrates a portion at which the chain 16 starts to enter the pulley. The chain 16 moves rightward along the arrow A in the figure. As for the chain element 44-1, its pin 42a-1 is clamped by the pulley 12 (or the pulley 14) and starts circular motion along with that pulley. The chain element 44-2 subsequent to the chain element 44-1 and the further subsequent chain element 44-3 have not yet entered the pulley and are included in a substantially linear portion extending between the pulleys. The portion that moves in circular motion along with the pulley of the chain 16 will be referred to as an arc portion, and the portion extending between the pulleys will be referred to as a chord portion. Although for the sake of simplicity only the pulley 12 will be explained below, the below description can also be applied to the pulley 14.

As for most of the chain elements included in the chord portion, the adjacent chain elements are arranged along a straight line and have no relative angle. However, when the chain element 44 starts to be included in the arc portion, it has an angle to the subsequent element. In FIG. 5, the preceding chain element 44-1 is included in the arc portion and has a relative angle to the subsequent chain element 44-2. This angle will be referred to as an "inter-adjacent element angle". Among the chain elements included in the chord portion, those positioned near the border with the arc portion may have an angle to the adjacent chain element, as discussed in detail further below. However, only in the description of FIG. 5, the chain elements 44-2 and 44-3 are arranged along a straight line.

When the adjacent two chain elements 44 are arranged along a straight line, contact point C between the pins is located inside in the chain thickness direction (the lower side in FIG. 5). As illustrated in FIG. 5, the contact point C between the pin 42a-2 of the preceding chain element 44-2 and the pin 42b-3 of the subsequent chain element 44-3 is located at Point C1 on the lower side. When the preceding chain element starts to enter the pulley, with the increase of the inter-adjacent element angle, the contact point C gradually moves upward. When the rear pin 42a of the preceding chain element 44 is clamped by the pulley, that chain element 44 becomes fully included in the arc portion. This state is illustrated as the chain element 44-1 in FIG. 5, and, at this time, the contact point C between the pin 42a-1 of the preceding chain element and the pin 42b-2 of the subsequent chain is located at Point C2. The contact point between the pins is not actually a point, but is a range with an area, because of deformation caused by contact pressure between the pins.

The description will be made on an assumption that there is an ideal condition that the pins are fully rigid bodies and contact each other at a point.

As such, when the positions of the two contact points C belonging to one chain element (for example, 44-2) are shifted in the thickness direction, a tension T acting on this chain element generates a force couple. This force couple generates a force F which lifts the rear end of this chain element. This force couple or the lifting force increases as the distance between contact points C1 and C2 Increases in the thickness direction. Therefore, the force couple or the lifting force increases as the preceding chain element 44 enters the arc portion from the chord portion.

Figure 6:
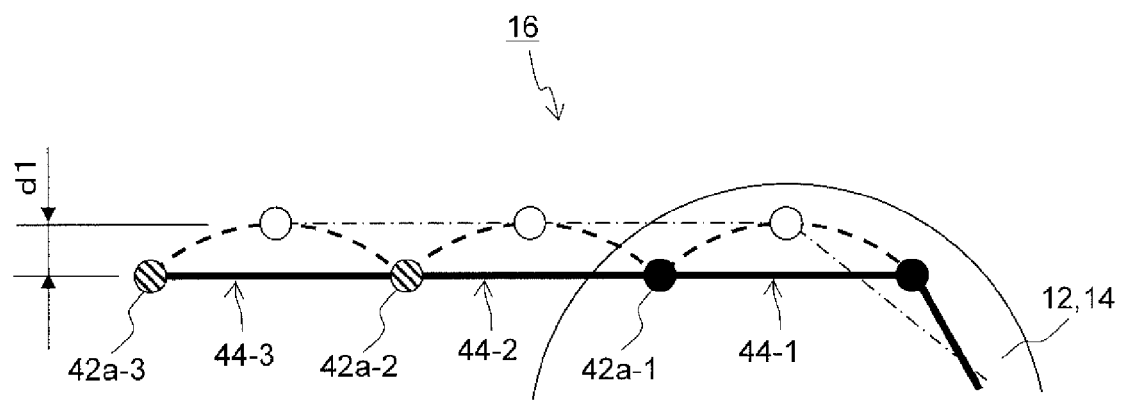
FIG. 6 is a diagram for explaining displacement of a chain chord portion when there is no lifting effect.
Figure 7:
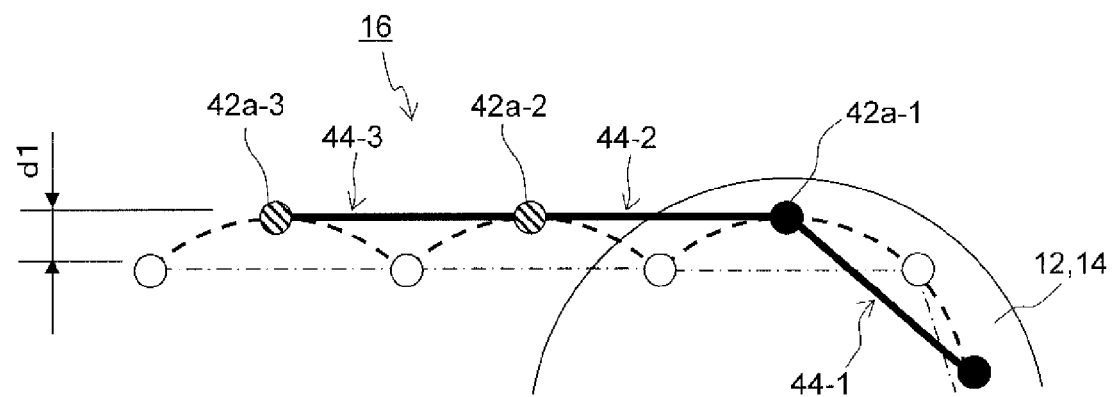
FIG. 7 is a diagram for explaining displacement of a chain chord portion when there is no lifting effect.

Next, displacement of the chord portion of the chain 16 will be described. FIG. 6 and FIG. 7 illustrate displacement of the chain when no force couple for lifting the rear end of the above-described chain element is generated; that is, when there is no lifting effect. FIG. 6 illustrates the rear pin 42a-1 of the preceding chain element 44-1 immediately after it is clamped by the pulley 12. The pins denoted by the black circles (for example, the pin 42a-1) indicate that they are clamped by the pulley 12, whereas the pins denoted by the shaded white circles (for example, the pin 42a-2) indicate that they are not clamped by the pulley 12. The subsequent chain elements 44-2 and 44-3 extend rearward from the pin 42a-1 at the same height as this pin. FIG. 7 illustrates the pin 42a-1 which has reached the highest position in the pulley (the highest position in the figure) after the chain 16 proceeds. The subsequent chain elements 44-2 and 44-3, again, extend rearward from the pin 42a-1 at the same height as this pin. The chain is displaced by an amount of displacement d1 between the states illustrated in FIGS. 6 and 7.

Figure 8:
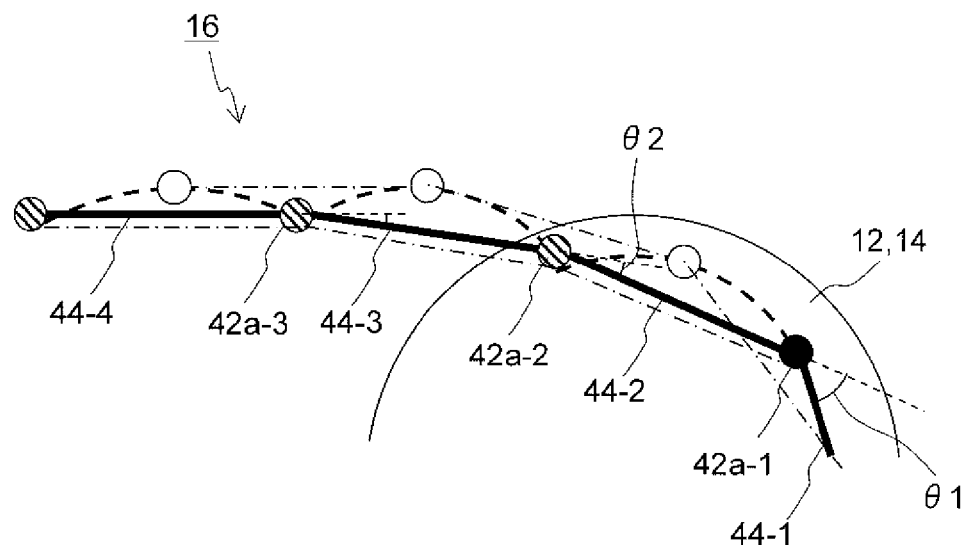
FIG. 8 is a diagram for explaining displacement of a chain chord portion when there is a lifting effect.
Figure 9:
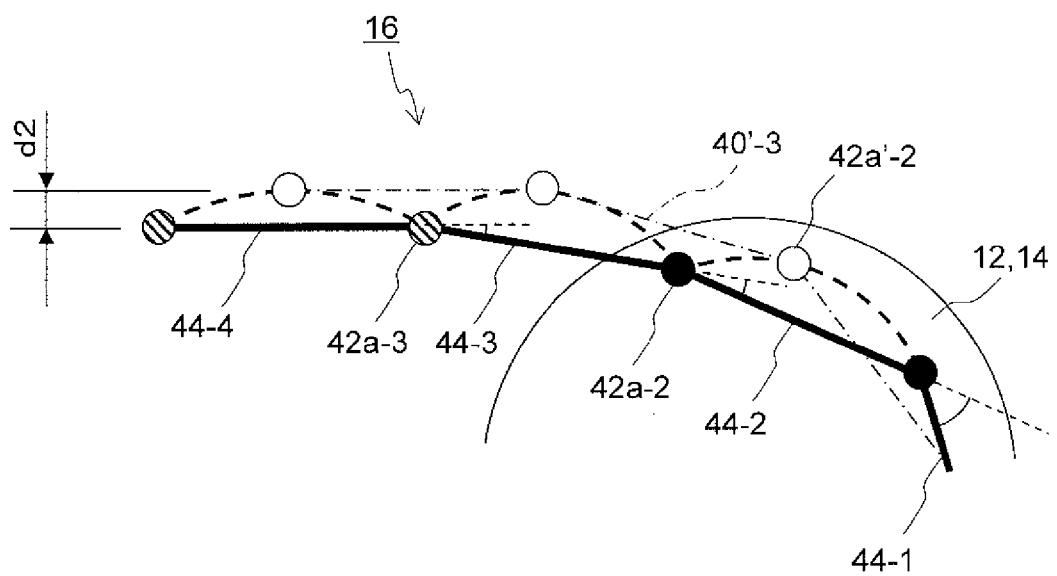
FIG. 9 is a diagram for explaining displacement of a chain chord portion when there is a lifting effect.

FIG. 8 and FIG. 9 are diagrams for explaining the lifting effect of the chain 16. FIG. 8 illustrates the chain element 44-2 immediately before it fully enters the pulley 12, more specifically, the pin 42a-2 of the chain element 44-2 immediately before it is clamped by the pulley 12. There is an angle θ1 (inter-adjacent element angle) between the chain element 44-2 and the preceding chain element 44-1. Therefore, the above-described force couple acts on the chain element 44-2, and the lifting effect is applied. As a result, the pin 42a-2 is located at a position higher than the pin 42a-1 of the preceding chain element 44-1. Because the chain element 44-2 is lifted, there is also an angle θ2 between the chain element 44-2 and the subsequent chain element 44-3. Therefore, the chain element 44-3 is also subjected to the force couple for lifting this chain element. As such, the force couple acts on not only the chain element 44-2 immediately before it enters the pulley but also the subsequent chain elements (for example, the chain elements 44-3 and 44-4).

FIG. 9 illustrates the chain element 44-2 which has fully entered the pulley 12. The pin 42a-2 is then clamped by the pulley 12 and moves along with the rotation of the pulley 12. Meanwhile, the force couple acts on the subsequent chain elements 44-3 and 44-4 that have not entered the pulley yet, so as to lift these elements. Therefore, the chord portion of the chain 16 is lifted to the positions denoted by the white circles and the dashed line in FIG. 9. At this time, an amount of displacement of the chord portion is d2, as illustrated in FIG. 9.

If there is no lifting effect, as illustrated in FIGS. 6 and 7, the displacement of the chord portion of the chain 16 is directly influenced by the movement of the pin 42a-1 in the pulley, and the displacement becomes larger. In FIGS. 8 and 9, the displacement of the chord portion is influenced not only by the position of the pin 42a-2 but also by the lifting effect due to the inter-adjacent element angle. Therefore, in FIGS. 8 and 9, the displacement of the chord portion of the chain 16 no longer directly reflects the movement of the pin 42a-2. Even when the pin 42a-2 is located near the highest point in the pulley 12 (42a'-2 in FIG. 9), the chain element 44'-3 is lifted, and the upper limit of the displacement of the chord portion becomes higher than the position of the pin 42a'-2. As the chain element is lifted before it enters the pulley, the displacement becomes smaller. However, if the pin is located near the highest point, and the subsequent chain element is lifted, this causes the chord portion to move to a higher position and acts in a direction to increase the displacement of the chord portion. If this point is improved, the displacement of the chord portion can further be reduced. Specifically, the displacement of the chord portion can be expected to be reduced by keeping the force couple relatively small between the position at which the pin has entered the pulley 12 and the position near the highest point, and by generating the large force couple immediately before the subsequent chain element enters the pulley. In other words, this is achieved by keeping the force couple small when the inter-adjacent element angle is small, and increasing the force couple as this angle increases.

Figure 10:
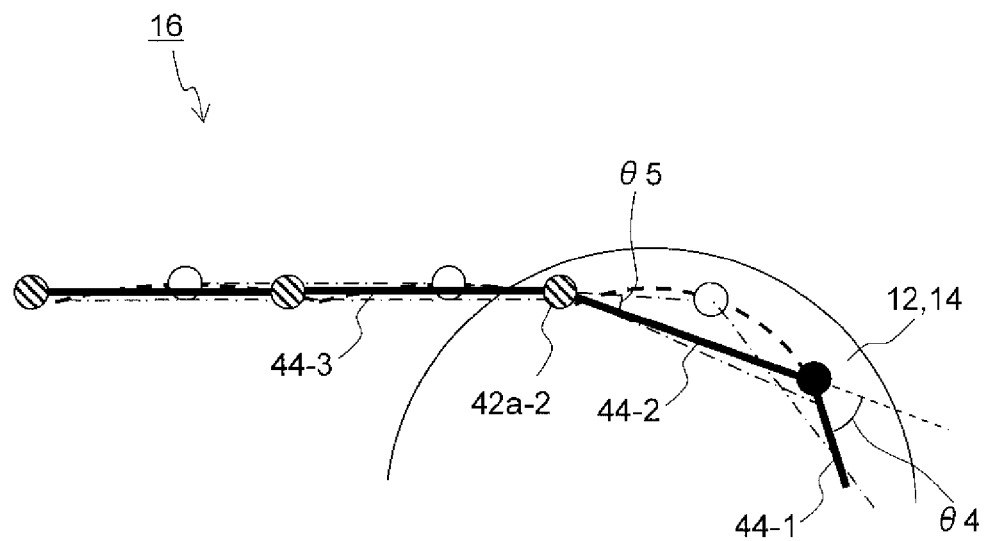
FIG. 10 is a diagram for explaining displacement of a chain chord portion when there is a lifting effect, but the lifting effect is suppressed as an inter-adjacent element angle is small.
Figure 11:
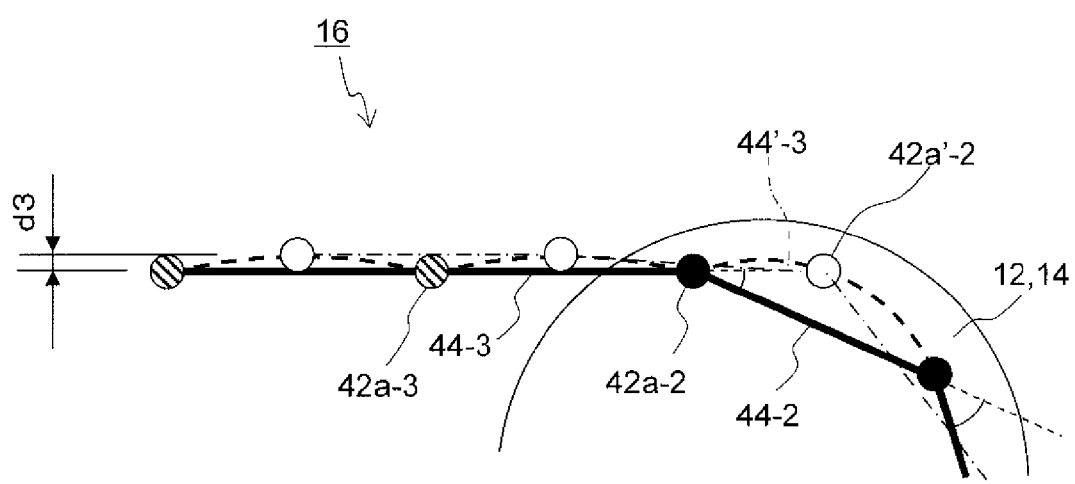
FIG. 11 is a diagram for explaining displacement of a chain chord portion when there is a lifting effect, but the lifting effect is suppressed as an inter-adjacent element angle is small.

FIGS. 10 and 11 illustrate examples in which the displacement of the chord portion is smaller than that in FIGS. 8 and 9. FIG. 10 illustrates the chain element 44-2 immediately before it fully enters the pulley 12; more specifically, the pin 42a-2 of the chain element 44-2 immediately before it is clamped by the pulley 12. There is an angle θ4 (inter-adjacent element angle) between the chain element 44-2 and the preceding chain element 44-1. An inter-adjacent element angle between the chain element 44-2 and the subsequent chain element 44-3 is θ5. When the angle is θ4, a relatively large force couple is caused to act, to thereby lift the chain element 44-2. Thus, the position at which the pin 42a-2 is first clamped by the pulley 12 becomes a relatively high position (see FIG. 11). On the other hand, when the inter-adjacent element angle is small as θ5, the force couple is reduced, to thereby suppress the lift of the chain element 44-3. Further, when the pin 42a-2 is near the highest point in the pulley (42a'-2 in FIG. 11), the force couple is reduced, and the chain element 44'-3 is not lifted to a large extent. Although the position of the pin 42a-2 becomes lowered after the pin 42a-2 passes the highest point, the lifting effect becomes larger, and the rear end of the subsequent chain element 44-3 is lifted. In doing so, the position of the pin 42a-3 of the subsequent chain element 44-3 is prevented from being lowered together with the pin 42a-2 of the preceding element, and enters the pulley while keeping its high position. As such, the displacement of the chord portion of the chain 16 becomes small as shown as d3 in FIG. 11.

The relationship between the inter-adjacent element angle and the force couple is adjustable by appropriately determining the shape of the contact surfaces of the pins that contact each other. The shape of these contact surfaces will be described below. As the shape of the side surfaces of the pins 42a and 42b is uniform in the width direction of the chain 16, the shape of a cross section orthogonal to the width direction will be described below. The contact surface therefore appears as a line in this cross section. This line will be referred to as an action curve.

Figure 12:
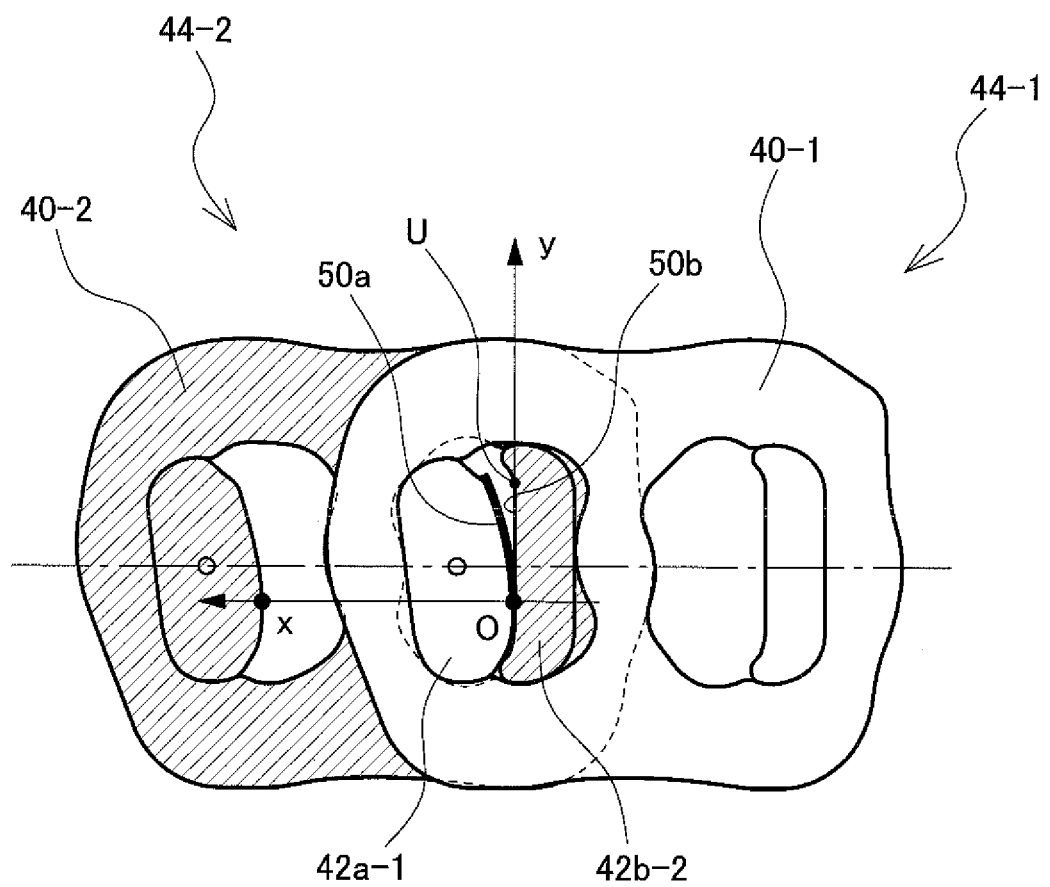
FIG. 12 is a diagram illustrating contact surfaces of pins.

FIG. 12 illustrates a coordinate system for representing the shape of the contact surfaces (action curve). The contact point between the two pins 42a-1 and 42b-2 is defined as the origin when the chain 16 extends linearly. The x axis represents a direction in which the chain 16 extends (circumferential direction), and the y axis represents the thickness direction. An action curve 50a of the pin 42a-1 is a curved line, and an action curve 50b of the pin 42b-2 is a straight line which is identical to the y axis. A change of the position of the contact point is determined by an interval between the two action curves 50*a* and 50*b*, and a curve representing this interval is referred to as a relative action curve. In the example of FIG. 12, because one action curve 50*b* is a straight line, the relative action curve is the other action curve 50*a* itself. If the two action curves are both curved lines, the action curves are determined such that the distance between points on the two action curves on the same y-coordinate becomes equal to the distance between the action curve 50*a* and the y axis on the same y-coordinate.

Figure 13:
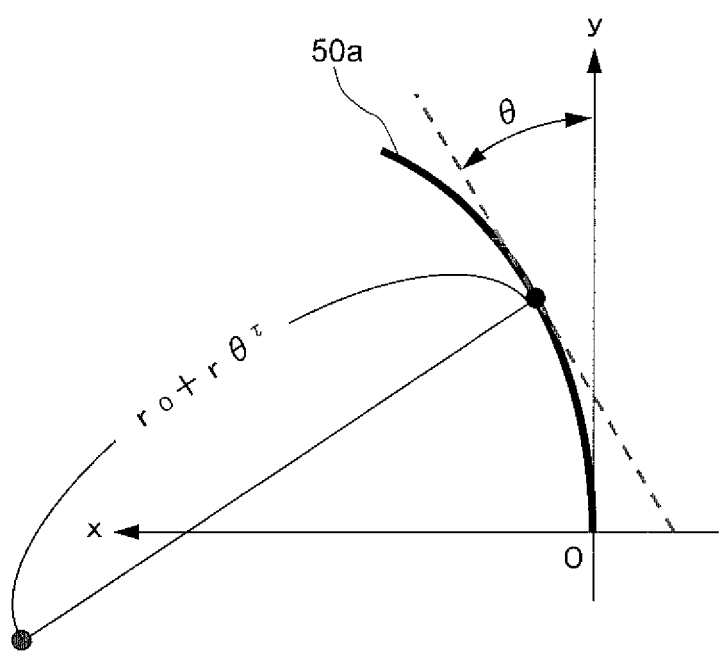
FIG. 13 is a diagram illustrating an example of an action curve representing a contact surface of a pin.

FIG. 13 is a diagram illustrating an example of the action curve 50*a*. The action curve 50*b* is identical to the y axis. As an example of the action curve 50*a*, the figure shows a curve which starts from the origin where the curve has a radius of curvature $r_0$ and has, when an angle between a tangent to the curve and the y axis is θ, an incrementally increased curvature radius at the contact point which is expressed, as shown in FIG. 13, by $$r_0 + r\theta^\tau \quad (1)$$

where $\tau > 1$, and $r_0$ and $r$ are any real numbers. If $\tau = 1$ in the above expression, the curve is an involute curve.

The action curve expressed by Expression (1) will be compared to the involute curve ($\tau = 1$). Variables $r$ and $r_0$ in Expression (1) are determined such that, even if τ is changed, the contact point between the pin 42*a*-1 and the pin 42*b*-2 (contact point between the action curves) is not changed when the chain 16 is wound around the pulley 12 with the minimum winding radius. When the chain 16 bends, the contact point between the action curves 50*a* and 50*b* moves from the origin on the y axis, and reaches the upper-limit point U when the chain is wound at the minimum winding radius. The variables $r$ and $r_0$ are determined such that, even if a value of differs, the contact point is positioned at the upper-limit point U when the chain is wound around the pulley with the minimum winding radius.

Figure 14:
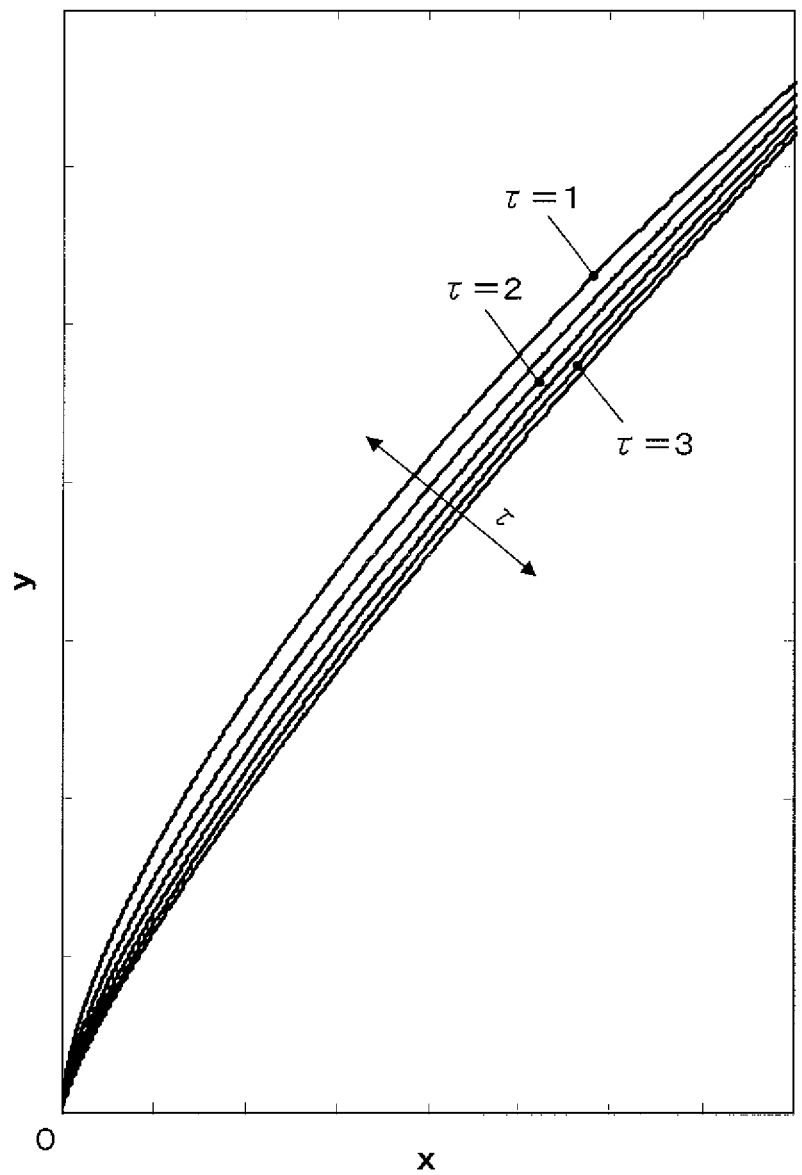
FIG. 14 is a diagram illustrating specific examples of action curves.

FIG. 14 is a diagram illustrating the shape of the action curve 50*a*. When the variable τ increases near the origin, the slope is reduced, and an amount of movement of the contact point is reduced.

Figure 15:
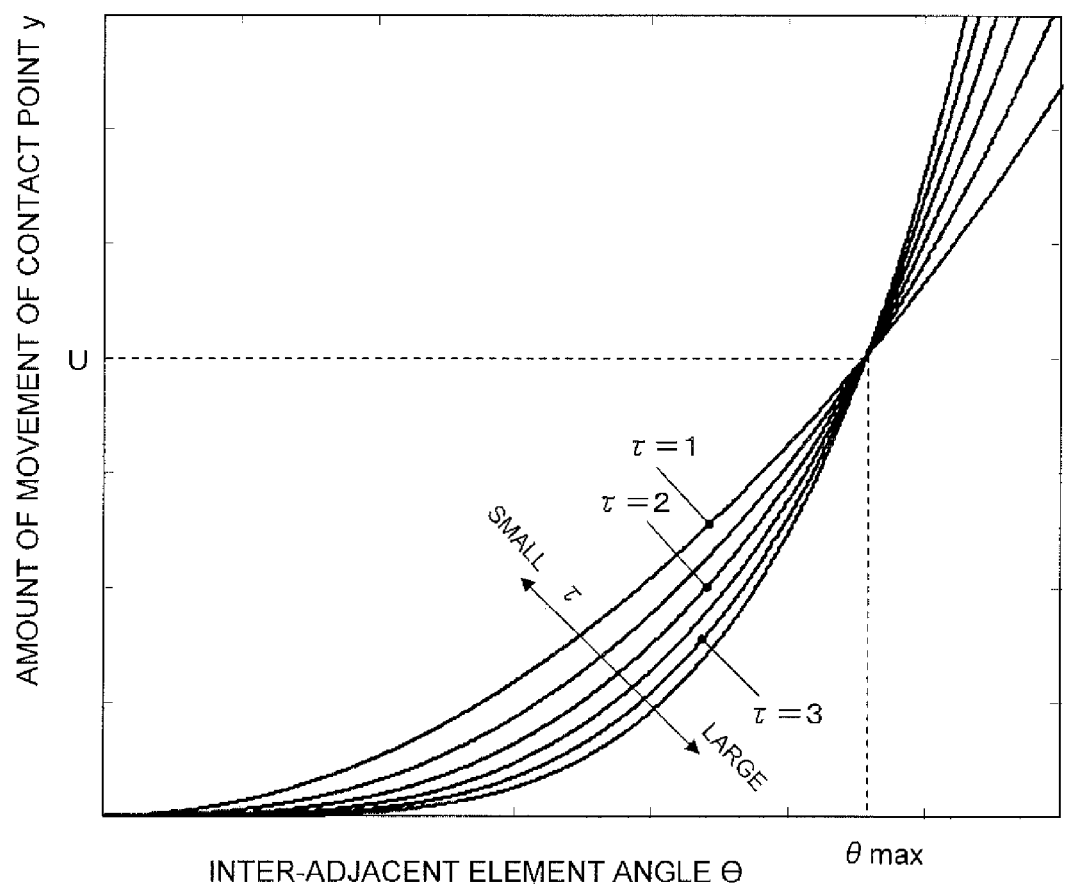
FIG. 15 is a diagram illustrating an amount of movement of a contact point with respect to an inter-adjacent element angle.

FIG. 15 is a graph illustrating the relationship between the inter-adjacent element angle θ and the amount of movement of the contact point. As the contact point moves on the y axis, the amount of movement of the contact point is identical to the y-coordinate of the contact point. When the inter-adjacent element angle θ becomes maximum (θ max) by determining the variable r in Equation (1) as described above; that is, when the chain is wound with the minimum winding radius, the contact point is located at the upper-limit point U on the contact surface. As the variable τ becomes greater, the amount of movement of the contact point y has a smaller increasing rate when the inter-adjacent element angle θ is small, and has a larger increasing rate when the angle θ becomes larger. In other words, it is understood that as the variable τ becomes greater, the force couple for lifting the chain element becomes smaller when the bending of the chain is small, and the force couple rapidly becomes larger when the bending of the chain becomes larger. Further, the curve representing the increase in the amount of movement of the contact point changes smoothly and becomes 0 when the inter-adjacent element angle θ becomes 0 and becomes maximum when θ becomes a maximum value.

Figure 16:
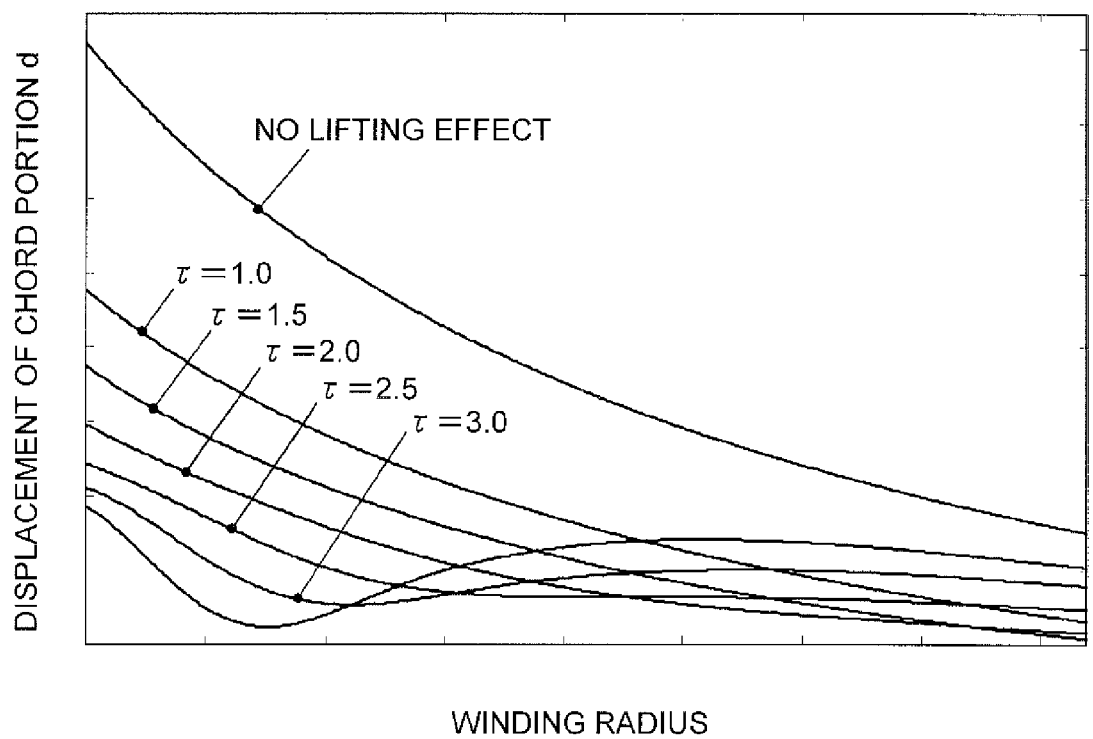
FIG. 16 is a diagram illustrating a relationship between a winding radius and displacement of a chain chord portion.

FIG. 16 illustrates the displacement d of the chain chord portion of the action curve 50*a* having different variables τ. The horizontal axis represents the winding radius of the chain 16 around the pulley 12. Although, when the winding radius is small, the displacement d of the chord portion is smaller as the variable τ becomes larger, there occurs a partial inversion as the winding radius becomes larger. If one pulley (for example, the pulley 12) has a smaller winding radius, the other pulley (for example, the pulley 14) has a larger winding radius. Therefore, even if the winding radius becomes smaller on one end within a possible winding radius, the winding radius on the other end becomes larger, and therefore, there will not be much chance to enjoy the effect of reducing the displacement of the chord portion. In other words, it is desirable that the displacement is small at both ends correspondingly. It is understood that although a desirable displacement depends on a possible winding radius, an overall great effect can be obtained when, roughly, τ=2.5 to 3.0.

As discussed above, when the chain element starts to enter the pulley, the lift of the chain element is suppressed if the inter-adjacent element angle is small, and the chain element is lifted after the inter-adjacent element angle becomes larger. Thus, it is possible to reduce the displacement of the chain chord portion.

What is claimed is:

1. A chain for a continuously variable transmission wound around two pulleys, the two pulleys having conical surfaces facing each other, the distance therebetween being variable, wherein:
   the chain comprises a plurality of chain elements interconnected in an endless manner;
   the chain element has
      a link unit having a plurality of plate-shaped links, each link having one or two openings and being located along a circumferential direction of the chain, the plurality of links are arranged in a width direction of the chain, and
      two pins extending through the one or two openings of the link at both ends of the link, respectively, and both ends of at least one of the two pins coming into contact with the conical surfaces;
   the chain elements adjacent to each other in the chain circumferential direction are interconnected by allowing a pin of one chain element to pass through the opening of the other chain element and vice versa, and when the chain bends, the contacting pins of the adjacent chain elements roll and contact;
   a relative action curve is defined as a relative shape of contact surfaces of the pins of the adjacent chain elements in a plane orthogonal to the width direction of the chain;
   the relative action curve has a shape which causes a contact point between the pins to move toward the outer side of the moving chain as an inter-adjacent element angle which is a relative angle between the adjacent chain elements becomes larger; and
   the relative action curve further has a shape which has a progressively increasing rate of an amount of movement of the contact point with increasing inter-adjacent element angle, the increasing rate being, compared to when the relative action curve has an involute shape, smaller when the inter-adjacent element angle is small and being larger when the inter-adjacent element angle becomes larger.

2. The chain for continuously variable transmission according to claim 1, wherein, when the inter-adjacent element angle is θ, a curvature radius of any point on the relative action curve is expressed by $$r_0 + r\theta^\tau$$

where $\tau>1$, and $r_0$ is a radius of curvature of the relative action curve at an origin where the chain is not bent and $r_0$ and r are any real numbers.

3. The chain for continuously variable transmission according to claim 2, wherein the $\tau$ is between 2.5 and 3.0.

4. The chain for continuously variable transmission according to claim 1, wherein each link has one opening.

5. The chain for continuously variable transmission according to claim 1, wherein each link has two openings.

6. A chain for continuously variable transmission wound around two pulleys, the two pulleys having conical surfaces facing each other, the distance therebetween being variable, wherein:
the chain comprises a plurality of chain elements interconnected in an endless manner;
the chain element has
a link unit having a plurality of plate-shaped links, each link having one or two openings and being located along a circumferential direction of the chain, the plurality of links are arranged in a width direction of the chain, and
two pins extending through the one or two openings of the link at both ends of the link, respectively, and both ends of at least one of the two pins coming into contact with the conical surfaces;
the chain elements adjacent to each other in the chain circumferential direction are interconnected by allowing a pin of one chain element to pass through the opening of the other chain element and vice versa, and when the chain bends, the contacting pins of the adjacent chain elements roll and contact;
a relative action curve is defined as a relative shape of contact surfaces of the pins of the adjacent chain elements in a plane orthogonal to the width direction of the chain;
the relative action curve has a shape which generates a force couple for lifting a subsequent chain element of the adjacent chain elements due to a tension generated in the chain as an inter-adjacent element angle which is a relative angle between the adjacent chain elements becomes larger; and
the relative action curve further has a shape which has a progressively increasing rate of the force couple with increasing inter-adjacent element angle, the increasing rate being, compared to when the relative action curve has an involute shape, smaller when the inter-adjacent element angle is small and being larger when the inter-adjacent element angle becomes larger.

7. The chain for continuously variable transmission according to claim 6, wherein, when the inter-adjacent element angle is $\theta$, a curvature radius of any point on the relative action curve is expressed by $$r_0 + r\theta^\tau$$

where $\tau>1$, and $r_0$ is a radius of curvature of the relative action curve at an origin where the chain is not bent and $r_0$ and r are any real numbers.

8. The chain for continuously variable transmission according to claim 7, wherein the $\tau$ is between 2.5 and 3.0.

9. The chain for continuously variable transmission according to claim 6, wherein each link has one opening.

10. The chain for continuously variable transmission according to claim 6, wherein each link has two openings.

11. A chain for continuously variable transmission wound around two pulleys, the two pulleys having conical surfaces facing each other, the distance therebetween being variable, wherein:
the chain comprises a plurality of chain elements interconnected in an endless manner;
the chain element has
a link unit having a plurality of plate-shaped links, each link having one or two openings and being located along a circumferential direction of the chain, the plurality of links are arranged in a width direction of the chain, and
two pins extending through the one or two openings of the link at both ends of the link, respectively, and both ends of at least one of the two pins coming into contact with the conical surfaces;
the chain elements adjacent to each other in the chain circumferential direction are interconnected by allowing a pin of one chain element to pass through the opening of the other chain element and vice versa, and when the chain bends, the contacting pins of the adjacent chain elements roll and contact;
a relative action curve is defined as a relative shape of contact surfaces of the pins of the adjacent chain elements in a plane orthogonal to the width direction of the chain;
the relative action curve has a shape which generates a force couple for lifting a subsequent chain element of the adjacent chain elements due to a tension generated in the chain as an inter-adjacent element angle which is a relative angle between the adjacent chain elements becomes larger; and
the relative action curve further has a shape which has a progressively increasing rate of an amount of movement of the subsequent chain element with increasing inter-adjacent element angle, the amount of movement being generated by the force couple, the increasing rate being, compared to when the relative action curve has an involute shape, smaller when the inter-adjacent element angle is small and being larger when the inter-adjacent element angle becomes larger.

12. The chain for continuously variable transmission according to claim 11, wherein, when the inter-adjacent element angle is $\theta$, a curvature radius of any point on the relative action curve is expressed by $$r_0 + r\theta^\tau$$

where $\tau>1$, and $r_0$ is a radius of curvature of the relative action at an origin where the chain is not bent and $r_0$ and r are any real numbers.

13. The chain for continuously variable transmission according to claim 12, wherein the $\tau$ is between 2.5 and 3.0.

14. The chain for continuously variable transmission according to claim 11, wherein each link has one opening.

15. The chain for continuously variable transmission according to claim 11, wherein each link has two openings.

* * * * *